United States Patent [19]

Stocchiero

[11] Patent Number: 5,209,991
[45] Date of Patent: May 11, 1993

[54] CONTAINER FOR LEAD-ACID STORAGE BATTERIES

[76] Inventor: Olimpio Stocchiero, 5 Via Kennedy, 36050 Montorso Vincentino (VI), Italy

[21] Appl. No.: 644,590

[22] Filed: Jan. 23, 1991

[30] Foreign Application Priority Data

Jan. 24, 1990 [IT] Italy .................. 85510 A/90

[51] Int. Cl.⁵ .................................. H01M 4/00
[52] U.S. Cl. ........................... 429/66; 429/163; 429/176
[58] Field of Search .............. 429/66, 176, 163

[56] References Cited

U.S. PATENT DOCUMENTS

| | | | |
|---|---|---|---|
| 2,906,805 | 9/1959 | Zahn | 429/66 |
| 3,993,507 | 11/1976 | Hardigg | 426/176 |
| 4,336,314 | 6/1982 | Yonezu et al. | 429/66 |
| 4,467,021 | 8/1984 | Stocchiero | 429/175 |

FOREIGN PATENT DOCUMENTS 136474 10/1985 European Pat. Off. .

*Primary Examiner*—Mark L. Bell
*Assistant Examiner*—Chris Gallo
*Attorney, Agent, or Firm*—Birch, Stewart, Kolasch & Birch

[57] ABSTRACT

A container for lead-acid storage batteries has essentially vertical walls (2) forming a quadrilateral in a plan view, and each wall having a plurality of internal and external perimetric recesses (6,7) having the same pitch (8). The recesses permit the lengthening of the walls (2) when these are subject to traction.

4 Claims, 1 Drawing Sheet

CONTAINER FOR LEAD-ACID STORAGE BATTERIES

BACKGROUND OF THE INVENTION

The invention concerns the realization of a container for lead-acid storage batteries acid storage batteries, particularly suited for static industrial lead.

It is known to the experts in this field that during operation of a battery the poles of lead-acid storage batteries are subject to lengthening, especially the positive pole. This characteristic is particularly relevant for industrial lead-acid storage batteries where the elements may become longer than 650 mm. In the lead-acid storage batteries of the known type the lengthening of the poles is accommodated either by connecting the lid to the container by means of a high yield point adhesive agent, or by using lids with a properly shaped surface, or lids on which the pole seats are shaped in such a manner as to make them elastic and yielding.

The known lead-acid storage batteries realized according to such characteristics have some inconveniences, i.e. the possibility for the lid or the container to become damaged during the disassembly phase when the lid is glued to the container itself, or a high manufacturing cost of molds in case the lead-acid storage batteries are realized with leads having their external surfaces or the poles seats showing such special configurations as to make them elastic and yielding.

It is also known to the experts in this field that the lead-acid storage batteries are made of plastic material, for example polypropylene, and are realized using the injection molding technique. The thickness of the container walls varies from a minimum of 2 mm to a maximum of 4 mm, where the thickness depends on the container dimensions and is considered to be optimal in order to provide a satisfactory resistance to mechanical stress on of the container itself.

One of the disadvantages of such containers is the high production costs which are due both to the high cost of the molds and to the considerable quantity of raw material necessary to produce each container.

SUMMARY OF THE INVENTION

The present invention proposes to eliminate the above mentioned inconveniences.

In fact, the main purpose of the present invention is to realize a container for lead-acid storage batteries which is elastic and has a longitudinal compliance and which compensates for the lengthening of the poles by elastic deformation of the container.

Another proposed purpose of the invention is to realize a container for lead-acid storage batteries that, in addition to the afore-mentioned characteristics of elasticity and yielding, has a lower production cost than that of the known type. In particular, the main purpose is that the container is realized by means of blow molding with thinner walls than those of the containers of the known type with the same external dimensions. Another purpose of the invention is that the container should contain more electrolyte than the containers of the known type with the same external dimensions.

All of the above mentioned purposes and others which will be better understood hereafter are fulfilled by a container for lead-acid storage batteries which, according to the claims, comprises:

essentially vertical walls preferably forming a quadrilateral in a plan view;

a plurality of low relief perimetric recesses alternately placed on both the external side and the internal side of said vertical walls;

an upper perimetric edge suited to receive a lid;

a plate bottom, said container being characterized in that the external perimetric recesses have a pitch, the value of which is essentially that of the pitch of the internal perimetric recesses, said recesses ensuring the lengthening of the walls subject to traction.

Advantageously according to the invention a container which is elastic in the axial direction for lead-acid storage batteries is realized, the lower production cost of which is due both to the saving of material due to the minimum thickness, the container being produced by blow molding, and to the savings due to the lower production cost of the molds.

Furthermore, advantageously the specific configurations of the perimetric recesses alternately placed on the container walls both internally and externally, together with the low thickness realized by the blow molding technique, permits the realization of a edge for the lid attachment. The external perimeter of this edge is vertically aligned with the trough of the internal recesses of the walls of the container itself. Therefore, this edge can easily receive a C-profiled lid having an outermost surface which does not project beyond the external perimeter of the external recesses of the container. After being glued.

The glued area does not need to be cleaned because the glue remains inside the C-profiled lid and also, consequently, within the external perimeter of the container.

Furthermore, advantageously, the edge of the container may receive a fixed lid as well, where, in this case too, the external perimeter of the lid does not project over the external perimeter of the container walls.

Moreover, the advantage of more electrolyte contained in the container is achieved, and consequently a better energetic performance is obtained then with the containers of the known type with the same external dimensions.

BRIEF DESCRIPTION OF THE DRAWINGS

The above-mentioned purposes and others which will be better described hereafter are reached by the description of a preferred embodiment of the invention given by way of illustration only, since various changes and modifications within the spirit and scope of the invention will become apparent to those skilled in the art from this detailed description and from the drawings, wherein.

DESCRIPTION OF THE PREFERRED EMBODIMENTS

Figures 1, 2, 3:
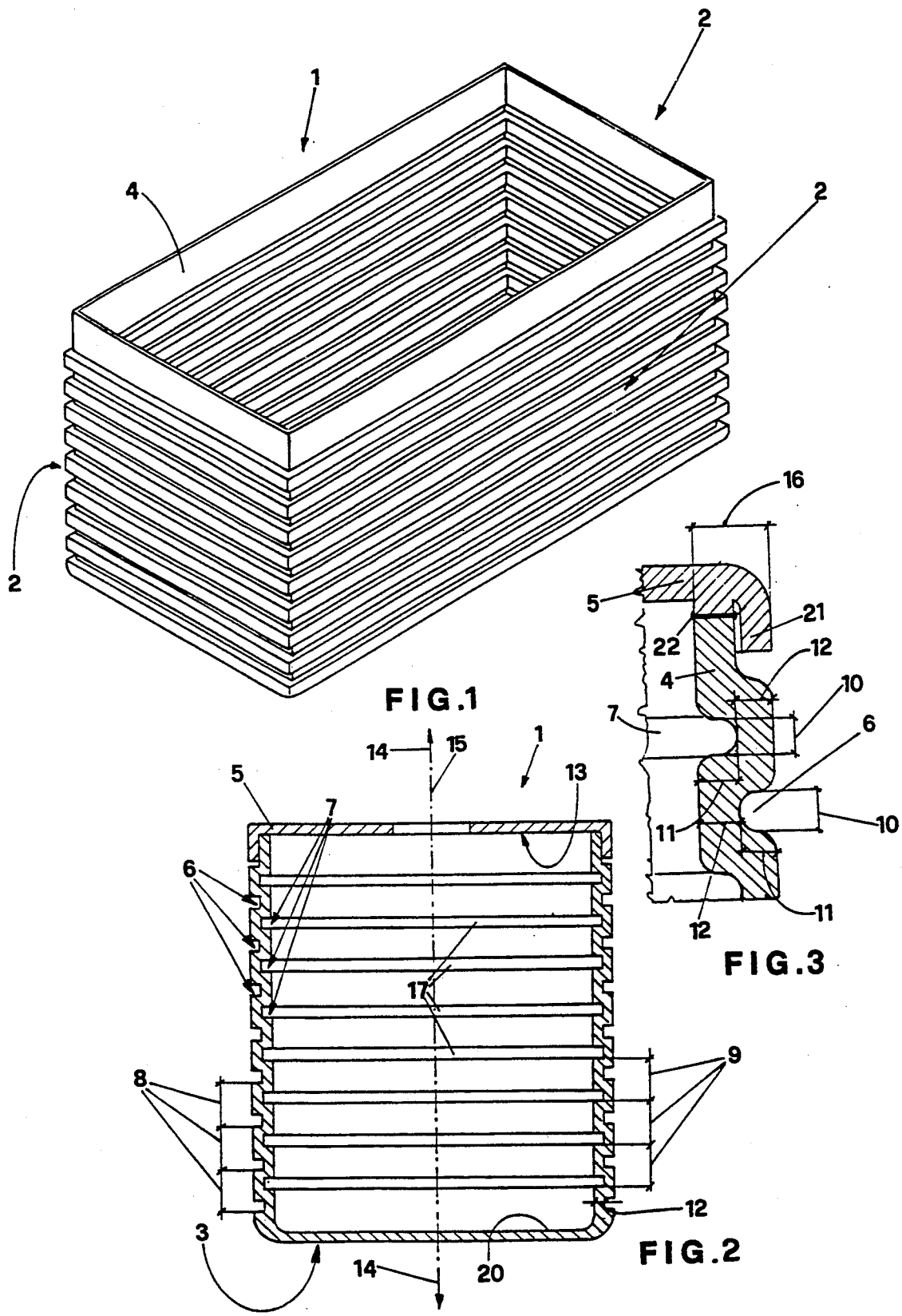
FIG. 1 shows a perspective view of the container according to the invention.
FIG. 2 shows a longitudinal section of the container shown in FIG. 1.
FIG. 3 shows an enlarged detail of the longitudinal section of the container shown in FIG. 2.

The container according to the invention is shown in FIG. 1, where it is indicated as a whole with 1. It can be observed that it has the form of a parallelepiped with four walls 2, limited by a bottom 3, which can be seen in FIG. 2, and by a perimetric edge 4 suited to receive a lid.

The parallelepiped form of the container shown in FIG. 1 is given by way of illustration only, since the container may have any prismatic form.

On the lateral walls of the container there are a plurality of external perimetric recesses 6, and a plurality of internal perimetric recesses 7, which, according to the preferred embodiment with reference to the mentioned Figures, have the following characteristics:

The perimetric recesses 6, 7 are alternately placed one to another, the one internally and the other externally to the container;

the value of the pitch 8 of the external perimetric recesses 6 is essentially the same as the value of the pitch 9 of the internal perimetric recesses 7;

as can be seen especially in FIG. 3, all the perimetric recesses have the same width 10 and the same depth 11;

the width 10 of each perimetric recess is the same as its depth 11;

the value of depth 11 of each recess is the same as the value of thickness value 12 of each wall 2 of the container in correspondence with the bottom of eah perimetric recess. All these geometric factors contribute to the realization of a container 1 whose lateral walls 2 have a uniform and constant resistance in correspondence with any cross-section realized through a horizontal plane passing through any perimetric recess.

In consequence of this, a uniform elastic compliance can be obtained for any wall 2 of the container 1 in the direction of the axis 15 of the container when said container is stressed by two equal and opposite forces coaxial with the same axis 15 of the container. It can be seen how under the action of said equal and opposite forces 14, each internal perimetric recess 7 or external recess 6 varies its width 10 to a value which is constant for all the perimetric recesses, thereby realizing the elastic lengthening of the vertical walls 2. The co-axial opposite forces 14, which in a real practical situation are produced by the lengthening of the poles contained in the container 1, are absorbed by the lengthening of the walls 2 of the container 1 itself, when the poles press against the bottom surface 13 of the lid 5 and against the internal surface 20 of the bottom 3.

It being understood that the values of the pitch 8 and 9 of the respective external and internal perimetric recesses 6 and 7 are the same, the described geometric configuration of the perimetric recesses may vary. For example, the value of the depth 11 of the perimetric recesses may be different from the value of the width 10 and also from the thickness 12 of each wall in correspondence with the bottom of each perimetric recess. In such a case a wall is realized having different elasticity depending on the different dimensions of the perimetric recesses.

The described geometric configurations of the perimetric recesses of each wall 2 of the container 1, apart from the characteristic of elasticity in the direction of its axis 15, permit more electrolyte to be contained then the containers of the known type with the same external dimensions. In fact, the container according to the invention, with the vertical walls 2 being shaped as described above, can be easily obtained by means of blow molding, which, apart from permitting considerable savings in the execution of molds compared to the cost necessary to produce injection molds for the realization of similar containers, also ensures a considerable reduction of the thicknesses 12 of the walls 2 in correspondence with each perimetric recess.

Furthermore, it can be observed in FIG. 3 that in the container according to the invention obtained by blow molding, the thickness 12 of the vertical walls 2 in correspondence with the perimetric recesses is more reduced than the thickness of a similar container realized by injection molding and having smooth walls wherein a major thickness is generally equal to the overall length 16 of the wall of the container according to the invention. The container 1 according to the invention presents an internal volume increased of the volume resulting from the sum by the volumes of rings 17, which correspond to the internal perimetric recesses 7, the external volume being the same.

As can be seen in FIG. 3, the alternate configuration of the perimetric recesses together with the low thicknesses realized by blow molding, permits the realization of the upper perimetric edge 4 of the container, having for example a thickness 12 equal to the thickness of each wall 2 and having an external perimeter vertically aligned, with the bottom of each internal perimetric recess.

Thus, the perimetric edge 4 can easily receive a C-profiled lid which is glued to the container and whose external edge 21 does not project over the external perimeter of the walls 2 of the container. Moreover, the glue 22 remains completely inside the lid 5, and since it does not overflow from the external perimeter of the container, no cleaning operation is necessary. This involves, in addition to a savings of time in the production, a better mechanical resistance of the glue 22 itself, which remains integral, being not subject to cleaning operations, and an uncompromised sealing capacity not compromised.

All of above mentioned purposes are fulfilled by the realization of the container according to the invention. In fact, the main purpose is realized, i.e. the realization of a container for lead-acid storage batteries, whose walls elastically lengthen in the axial direction so as to accommodate the lengthening of the poles. It can be seen how this purpose is fulfilled by realizing a plurality of external perimetric recesses 6 and internal perimetric recesses 7 on the container walls 2, said recesses contributing the specific yielding and elastic geometric configurations of the walls. The characteristics of elasticity and resistance may be varied by properly varying the dimensions and number of perimetric recesses.

It has also been seen how this container can be easily realized by blowing molding technique, and therefore with remarkably lower costs than those the costs which are necessary to produce a container with the same external dimensions and realized with the injection molding technique where the cost reduction is due both to the lesser production cost of molds and to a savings of raw material used for the realization of the container.

The purpose of realizing a container has also been reached which, since it presents a more reduced wall thickness than an injection molded container with the same external dimensions, permits more electrolyte to be contained, and consequently also permits the realization of a lead-acid storage battery with more energetic capacity.

It has also been seen how a C-profiled lid may be applied to the external perimetric edge of the container, the external perimeter of the lid not projecting over the perimeter of the container itself. Said lid can be glued and no cleaning operations are required. A lid connected and sealed by pressure to the container can be applied as well, the external perimeter of which does not project over the external perimeter of the container itself.

As has already been said, the geometric characteristics of the described container 1 according to the invention may be varied, for example the thickness 12 of the vertical walls 2 in correspondence with the perimetric recesses 6 and 7 may vary, and so do their depths or there widths 10.

As far as the shape of the container according to the invention is concerned, it has already been said that the container may have any shape, even a non-quadrilateral one.

It is understood that said execution variants shall be considered to be protected by the present invention.

I claim:

1. A container for a lead-acid storage battery, comprising:

essentially vertical walls forming a quadrilateral, said vertical walls having internal surfaces and external surfaces;

a plurality of low-relief external and internal perimetric recesses formed in said external surfaces and said internal surfaces of said vertical walls, said external perimetric recesses having a constant pitch and said internal recesses having a constant pitch, the two pitches being essentially equal in value;

an upper perimetric edge formed on said vertical walls;

a lid received on said upper perimetric edge; and a plate bottom joining said vertical walls opposite said upper perimetric edge;

said external and internal recesses permitting said vertical walls to lengthen during battery operation.

2. The container according to claim 1, wherein each of said external and internal perimetric recesses has a depth which is equal to or greater than a thickness of said vertical walls.

3. The container according to claim 1, wherein said upper perimetric edge has an external surface which is vertically aligned with troughs of said internal recesses, such that said lid is installed on said upper perimetric edge with an outermost surface of said lid projecting no farther than an external perimeter of said external recesses.

4. The container according to any one of claims 1, 2 or 3, wherein said vertical walls are deformable within a limit of elasticity in a direction of a longitudinal axis of said container when said vertical walls are subjected to equal and opposite forces generated on said lid and on said plate bottom of said container by elongation of poles of said battery.

* * * * *